(12) United States Patent
Bonfils

(10) Patent No.: US 6,991,072 B2
(45) Date of Patent: Jan. 31, 2006

(54) BRAKE DEVICE FOR THE ROTOR OF A HELICOPTER OR THE LIKE, ASSOCIATING A MAIN BRAKE MECHANISM HAVING A DISK AND A SECONDARY BRAKE MECHANISM FOR USE IN STRONG WIND

(75) Inventor: Michel Bonfils, Saint Cannat (FR)

(73) Assignee: Eurocopter, Marignane Cedex (FR)

( * ) Notice: Subject to any disclaimer, the term of this patent is extended or adjusted under 35 U.S.C. 154(b) by 0 days.

(21) Appl. No.: 11/010,277

(22) Filed: Dec. 14, 2004

(65) Prior Publication Data

US 2005/0133314 A1   Jun. 23, 2005

(30) Foreign Application Priority Data

Dec. 19, 2003   (FR)   ................................. 03 14976

(51) Int. Cl.
  *F16D 55/224*   (2006.01)
(52) U.S. Cl. ..................................... 188/72.7; 188/72.6
(58) Field of Classification Search ...... 188/71.7–71.9, 188/72.6–72.9; 416/169 R
  See application file for complete search history.

(56) References Cited

U.S. PATENT DOCUMENTS

| 2,600,715 | A | | 6/1952 | Wheeler | |
|---|---|---|---|---|---|
| 2,938,607 | A | * | 5/1960 | Kershner et al. | 188/72.8 |
| 3,185,263 | A | | 5/1965 | Schanz et al. | |
| 3,802,539 | A | * | 4/1974 | Thiele | 188/72.9 |
| 4,066,152 | A | * | 1/1978 | Pascal | 188/171 |
| 4,154,321 | A | * | 5/1979 | Falk | 188/72.7 |
| 4,651,852 | A | * | 3/1987 | Wickham et al. | 477/4 |
| 4,966,256 | A | * | 10/1990 | Hunt | 188/72.7 |
| 5,348,123 | A | * | 9/1994 | Takahashi et al. | 188/72.1 |
| 5,501,305 | A | * | 3/1996 | Stalmeir et al. | 188/167 |
| 5,660,250 | A | * | 8/1997 | Treude | 188/72.9 |
| 6,722,477 | B1 | * | 4/2004 | Wolfsteiner et al. | 188/72.9 |
| 2005/0011719 | A1 | * | 1/2005 | Oishi et al. | 192/99 S |
| 2005/0029858 | A1 | * | 2/2005 | Forster et al. | 303/20 |

FOREIGN PATENT DOCUMENTS

| DE | 423023 | 12/1925 |
|---|---|---|
| FR | 2683503 | 5/1993 |

* cited by examiner

Primary Examiner—Christopher P. Schwartz
(74) Attorney, Agent, or Firm—Young & Thompson

(57) ABSTRACT

A brake device for the rotor of a helicopter, the device associating a mechanism having a disk and a manual control for main braking of the rotor, and a mechanism for secondary braking of the rotor under strong wind. The secondary braking device includes a secondary lever hinged to the body and capable of being actuated against secondary return elements to drive a bearing finger against a main lever of the main brake mechanism and cause the jaws of the mechanism to move correspondingly towards each other so that the secondary lever actuates the main lever in order to amplify the clamping forces applied to the disk by the jaws in comparison with the forces they exert when driven by the main lever alone.

12 Claims, 2 Drawing Sheets

BRAKE DEVICE FOR THE ROTOR OF A HELICOPTER OR THE LIKE, ASSOCIATING A MAIN BRAKE MECHANISM HAVING A DISK AND A SECONDARY BRAKE MECHANISM FOR USE IN STRONG WIND

The present invention relates to the field of driving the rotors of helicopters or the like in rotation, and more particularly it relates to brake mechanisms for acting against said drive. The invention provides a brake device for a helicopter rotor associating a main brake mechanism having a disk with a secondary brake mechanism for use in strong wind.

BACKGROUND OF THE INVENTION

A helicopter or the like is fitted with a rotor that is driven in rotation by engine means, in particular by turbines. The rotor is also fitted with a main brake mechanism to prevent the rotor from turning after the engine means have stopped. The main brake mechanism is conventionally a mechanism of the type comprising a,disk that is clamped between jaws carrying brake linings, and is of the type that is under manual control that provides sufficient force to prevent the rotor from turning against its own inertia when it is no longer driven by the engine. It should be observed that in order to avoid excessive heating of the brake linings and corresponding premature wear thereof, the main brake mechanism is fitted with detector means to prevent the engine means from being operated while the rotor is being braked. In practice, the pilot usually waits for a freely rotating rotor to reach a speed of rotation that is below a threshold that is tolerable for operating the brake mechanism.

There is also a problem of the rotor rotating under a strong wind, during both take-off and landing of the helicopter. In particular, in order to start up a rotor under such weather conditions, it is helpful to prevent the rotor from moving during the initial stages of putting the engine means into operation.

It can be seen that the braking force to be generated is large and that the above-mentioned manually-controlled brake mechanisms are insufficient and inappropriate. This problem is made particularly difficult to solve for heavy helicopters where the power of the engine means is proportionate to the mass of the vehicle. It has been proposed to fit such helicopters with a brake mechanism in which the jaws are driven hydraulically, and are thus capable of generating suitable, large braking forces. Such mechanisms are commonly organized in such a manner as to apply selective braking forces depending on weather conditions and on the starting and/or stopping stages of the rotor. It should be observed, as mentioned above, that the braking forces applied are selected in association with authorization to operate or not operate the various engine means for driving the rotor during an initial starting stage.

Nevertheless, it can be seen that the use of such brake devices that are driven and controlled hydraulically leads to a structure that is complex and heavy. In addition, the heating generated by braking the rotor and the location of hydraulic members close to the rotor transmission box requires safety means to be provided against the risk of fire.

In order to avoid ubiquitous use of hydraulic members, proposals have also been made for a hybrid brake mechanism for a helicopter rotor of the type comprising a disk mechanism under manual control, in which the jaws are driven to clamp the disk under the control of a lever for setting the hydraulic means into operation. The hydraulic means generate a force that is appropriate for secondary braking under strong winds, and they also satisfy the requirements for the necessarily-lower forces that are sufficient for main braking. For example, reference can be made to document FR 2 683 503 (Aerospatiale).

Nevertheless, it should be observed that in this field, when it comes to organizing rotor brake means, there is a constraint that not only must the means be as simple and as lightweight as possible, but they must also take up as little space as possible.

As a result, in general, designers tend to look for solutions that provide a compromise between all of the above-mentioned constraints, in order to organize the rotor brake means, both main brake means for use after the rotor drive engine means have stopped, and secondary brake means for use under strong winds, in particular so that they comply with satisfactory conditions in terms of safety, for bulk, complexity, and weight that must be kept as small as possible and/or must be as well adapted as possible to the type of helicopter involved, in particular in relation to the weight of the helicopter.

OBJECTS AND SUMMARY OF THE INVENTION

The object of the present invention is to propose a brake device for a helicopter rotor that makes use of a main brake mechanism of the disk type and a secondary brake-mechanism for use in strong wind, and that satisfies the above-mentioned compromise.

The device of the present invention is a brake device for the rotor of a helicopter or the like, which associates a disk and a manual control mechanism for main braking of the rotor with a mechanism for secondary braking of the rotor under strong wind. These brake mechanisms are operated by the pilot from the helicopter cockpit via respective main and secondary control means. These control means are, in particular, manual control means making use of a mechanism for controlling a remote member, where the mechanism is of the type that uses a cable, a rod, or the like.

More particularly, the main brake mechanism comprises a disk that is constrained to rotate with the rotor, that can be prevented from moving by a pair of jaws opposably mounted on a body so as to engage opposite sides of the disk. A main lever is hinged to the body to drive the jaws against main return means for returning the jaws to an initial position.

In a first aspect of the present invention, the secondary brake mechanism comprises a secondary lever hinged to the body and capable of being actuated against secondary return means. The secondary lever is organized to drive a finger to bear against the main lever, thereby causing the jaws to move correspondingly towards each other. These dispositions are such that the secondary lever actuates the main lever in order to amplify the clamping forces applied to the disk by the jaws in comparison with the forces they exert when driven by the main lever alone.

The dispositions provided by the present invention seek not only to provide secondary brake means that are effective and reliable, under satisfactory safety conditions, but also to make possible such an organization of these means that is unusual in the field, starting from intuitive choices that make best use of the members of the main brake mechanism for the purpose of implementing the secondary brake mechanism, while also reducing the general overall size of the brake device, both in terms of the main brake mechanism and in terms of the secondary brake mechanism.

In another aspect of the present invention, the lever arm ratio of the main lever preferably lies in the range about 6 to 8, and is in particular about 7, while the lever arm ratio of the secondary lever lies in the range about 9 to 12, and is in particular about 10. The secondary lever actuates the main lever in a zone of the main lever that corresponds to a lever arm ratio of about 1.

The term "lever arm ratio" has its usual meaning and refers to the ratio of the length of the long arm divided by the length of the short arm of a given lever. These lengths are measured from the hinge axis to the lever part where the input and output forces are applied.

In addition, the secondary lever is preferably hinged to the body at its distal end, and bears against the finger in the vicinity of said distal end. The finger itself bears against the main lever on a zone thereof that is situated at a distance L1 from the hinge axis of the main lever, where L1 that is of the same order as the distance L'1 between said hinge axis and the distal end of the main lever, which distal end of the main lever bears against at least one of the jaws in order to move it towards the other jaw.

Furthermore, the main and secondary levers are preferably of substantially equivalent length. The finger bears against the main lever in a zone thereof that is situated at a distance from the distal end of the main lever that lies in the range approximately one-fourth to one-third of its length.

In a preferred organization of jaw mobility, one of the jaws is mounted to move relative to the body while the other jaw is mounted stationary thereon. It will be understood that under such circumstances, the disk is preferably mounted free to move in translation on the rotary shaft of the rotor. The main lever bears against the moving jaw so as to drive it towards the stationary jaw, by means of a rod or the like fitted to the distal end of the main lever.

The finger and the secondary return means are advantageously organized as a spring piston carried by the body.

In particular, the finger is made up of telescopically-mounted elements having secondary return means disposed between them and bearing against them. These dispositions are such that thrust exerted on the finger by the secondary lever compresses the secondary return means, while simultaneously causing the finger to bear against the main lever in order to drive it.

In a second aspect of the present invention, the device preferably includes means for preventing the secondary brake mechanism being put into operation prior to the main brake mechanism being put into operation. These dispositions are such that putting the secondary brake mechanism into operation is dependent on the main brake mechanism being put into operation beforehand. In a preferred embodiment, these means are constituted in particular by means organized as keying means arranged inside the helicopter cockpit in the vicinity of the control means for putting the main and secondary brake mechanism into operation.

Since the main brake mechanism is fitted with main detector means for detecting that it has been put into operation, for the purpose of operating means for inhibiting engine drive to the rotor, where appropriate, the secondary brake mechanism is preferably fitted with secondary detector means for detecting that it has been put into operation, to act, where appropriate, to allow said engine drive to be applied in spite of the main inhibition means being operated.

These secondary detector means comprise in particular an end-of-stroke sensor for the secondary lever to guarantee that engine drive is applied to the rotor after the secondary brake mechanism has been operated and to allow the rotor to be driven as from simultaneous release of the levers by the corresponding main and secondary control means.

The term "means for inhibiting the application of engine drive to the rotor" is used to designate means for inhibiting positive drive of the rotor in rotation. More precisely, and for example, the means for inhibiting the application of engine drive to the rotor could equally well be means for interrupting the mechanical connection between the engine means and the rotor, or indeed means for completely or partially inhibiting operation of the engine means for driving the rotor so as to inhibit, or at least limit, the power involved in driving the rotor.

In a preferred embodiment, the main and secondary levers are fitted with means for adjusting their stroke. For the main lever, these adjustment means are means for adjusting the inclination of the main lever, in particular to compensate brake lining wear on the jaws, whereas for the secondary lever, which is a constant stroke lever, these adjustment means are interposed between the secondary and main levers in order to adjust stroke of the bearing finger.

BRIEF DESCRIPTION OF THE DRAWINGS

The present invention will be better understood and details concerning it will appear better from the following description of a preferred embodiment, given with reference to the figures on the accompanying drawing sheets, in which.

MORE DETAILED DESCRIPTION

Figure 1:
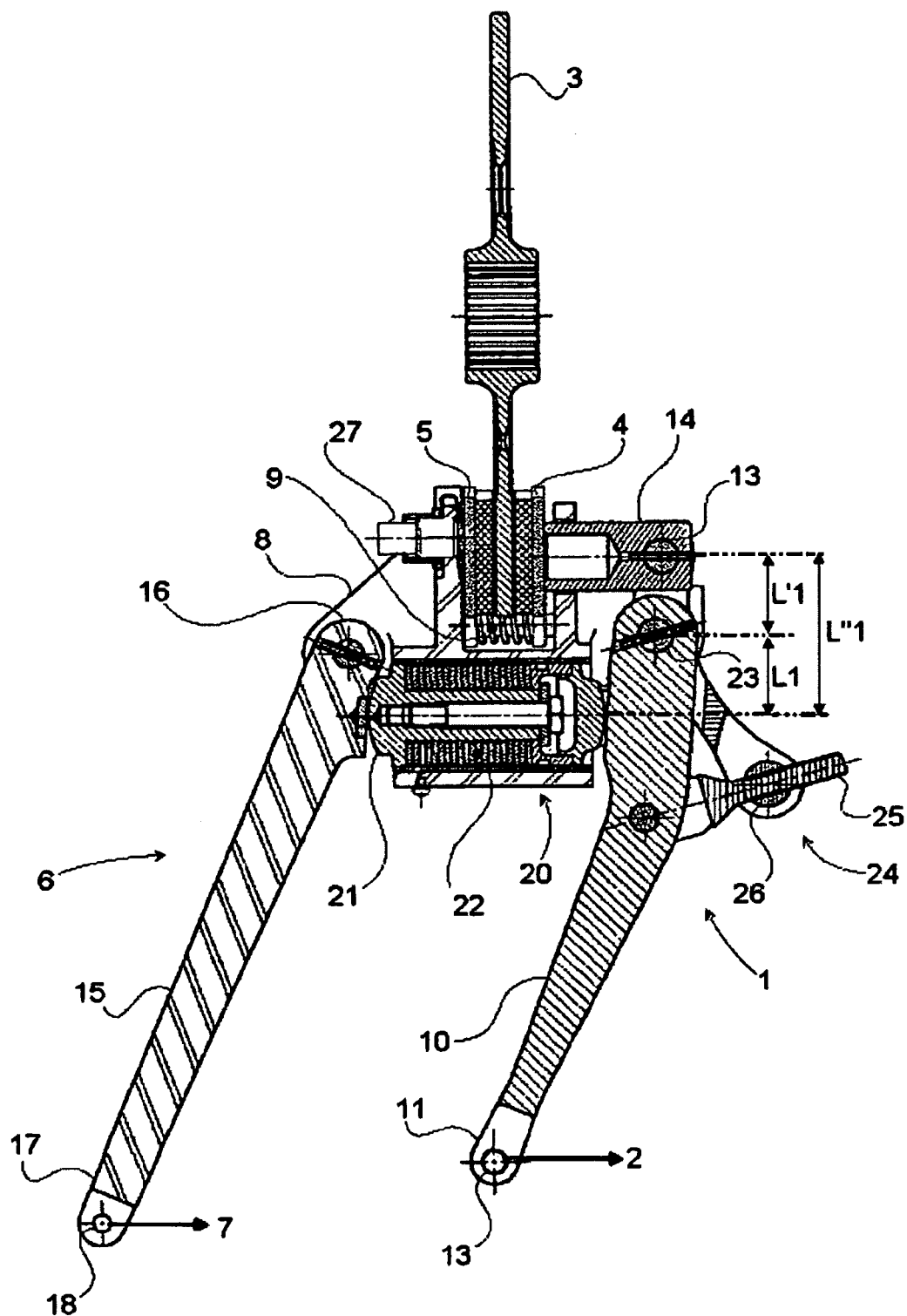
FIG. 1 is a longitudinal section view of a braking device of the present invention.
Figure 2:
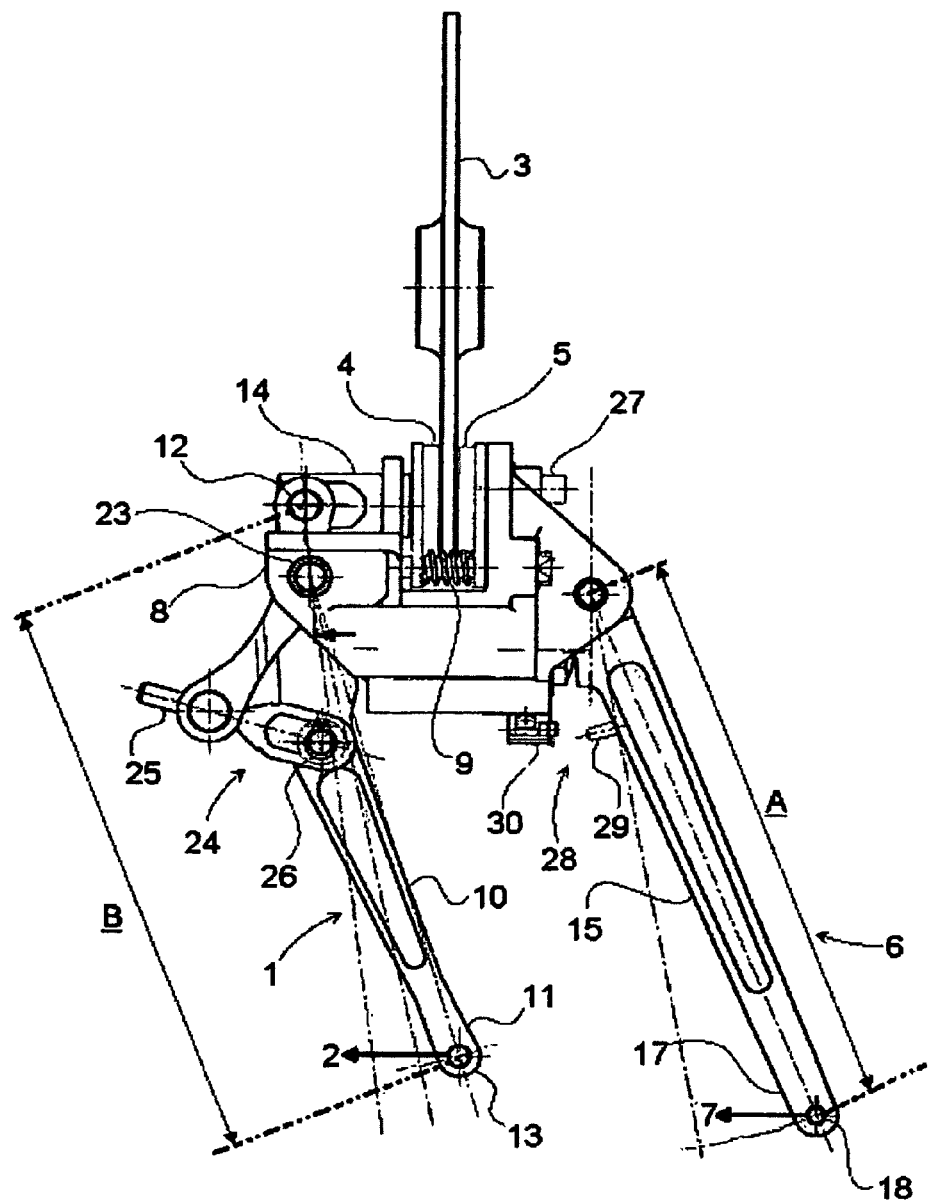
FIG. 2 is a side view of the device shown in FIG. 1.

In the figures, a device for braking the rotor of a helicopter is intended to hold it against being driven in rotation, both against its own inertia when switching off its engines, and to enable the helicopter to take off under a strong wind in satisfactory conditions of safety. The brake device associates a main brake mechanism 1 of the type having a manual control 2 and a disk 3 that can be clamped between jaws 4 and 5, and a secondary brake mechanism 6 having a manual control 7, and which is associated with the main brake mechanism 1 in order to enable the rotor of the helicopter to be set into rotation under a strong wind.

The main brake mechanism 1 comprises a disk 3 constrained to rotate with the rotor, in particular via a fluted shaft or the like, on which the disk is mounted free to move in translation. The disk 3 is disposed between jaws 4 and 5 of the main brake mechanism 1, and each of which jaws is provided with brake lining in the manner that is conventional in this field. A first jaw 5 is stationary, being provided on a body 8, while a second jaw 4 is supported by the body 8 so as to be movable in translation in order to be drivable towards the other jaw 5 in order to clamp the disk 3 between the jaws. The moving jaw 4 is driven against main return means 9, e.g. constituted by a compression spring interposed between the two jaws 4 and 5 so as to return the moving jaw 4 into its initial, rest position, in which no clamping force is applied to the disk 3.

The moving jaw 4 can be driven by the helicopter pilot via a main lever 10 so as to move it towards the stationary jaw 5 in order to exert a clamping force on the disk 3 so as to stop the rotor from rotating after the engine has been turned off. This main lever 10 is hinged to body 8 at a point lying between its own two ends 11 and 12. Its proximal end 11 is provided with an anchor member 13 for receiving a main manual control member 2, in particular a rod, a cable, or the like. Its distal, other end 12 bears against the main jaw 4 via a drive member 14, in particular a link or the like.

The secondary brake mechanism 6 has a secondary lever 15 that is hinged to the body 8 at its distal end 16, while its proximal end 17 is provided with an anchor member 18 for receiving a secondary manual control member 7, in particular a rod, a cable, or the like. A spring piston 20 is interposed between the secondary and main levers 15 and 10.

In the embodiment shown, the spring piston 20 is constituted by a finger 21 arranged as a set of telescopic elements, mounted to move inside a chamber in the body 8. The ends of the finger 21 are preferably provided with spherical bearing surfaces in order to encourage them to bear against the first lever 15 and the main lever 10 respectively. A stack of spring washers is interposed between shoulders of the telescopic elements of the finger 21 so as to constitute secondary return means 22, causing the finger 21 to be driven, together with the secondary lever 15, spontaneously into the initial rest position, in the absence of any drive force being exerted on the lever 15 by the pilot via the corresponding control member 7.

When the pilot operates the secondary lever 15, the finger 21 is moved against the secondary return means 22, with the finger 21 then exerting thrust against the main lever 10 in order to cause the moving jaw 4 of the main brake mechanism 1 to move.

The secondary lever 15 bears against the finger 21 close to its distal end 16 via which the secondary lever 15 is hinged to the body 8. In addition, the length A of the secondary lever 15 is of the same order as the length B of the main lever 10, and the finger 21 bears against the main lever in a zone thereof that is set apart from the hinge axis 23 of the main lever 10 on the body 8 by a distance L1 that is of the same order as the distance L'1 between the hinge axis 23 and the distal end 12 of the main lever 10, whereby the main lever bears against the moving jaw 4. In addition, the distance L"1 between the bearing zone of the finger 21 against the main lever 10 and the distal end 12 of the main lever acting on the jaw 4 lies in the range one-fourth to one-third the length B of the main lever 10.

The main brake mechanism 1 is fitted with means for adjusting the stroke of the main lever 10, and more particularly means 24 for adjusting its angle of inclination in the initial, rest position, in particular for the purpose of compensating brake lining wear. The secondary lever 15 is of constant stroke, with adjustment means being interposed between the main lever and the secondary lever to adjust the stroke of the finger 21.

It should be observed that advantage is preferably taken of the means 24 for adjusting the stroke of the main lever 10, to adjust also the stroke of the secondary lever 15, and more particularly to contribute to adjusting the distance between the finger 21 and the corresponding bearing zone of the main lever 10, which distance is preferably zero in order to optimize the secondary braking forces applied against the disk 3, starting from optimizing operation of the stroke of the secondary arm 15 compared with the stroke of the jaws 4 and 5 towards each other. It will be understood that the finger 21 and the main lever 10 are preferably maintained in contact with each other in the initial, rest position of the secondary lever 15 by regularly adjusting the inclination of the main lever 10.

In the embodiment shown, these adjustments means 24 are mainly constituted by a telescopic member 25 of adjustable length, such as a screw co-operating with a complementary housing 26 in the body 3, which comes to bear at its ends respectively against the body 3 and against the main lever 10 so as to adjust the inclination in the initial, rest position.

The main brake mechanism 1 is also fitted with a main detection sensor 27 for detecting implementation of main braking, said sensor 27 being secured, for example, to the body 3 in the vicinity of the stationary jaw 5. When the main sensor 27 detects a clamping force exerted against the disk 3, it acts to inhibit engine drive to the rotor so as to prevent such engine drive being applied in the event of the main lever 10 being operated by the pilot using the main control member 2.

Implementation of the secondary brake mechanism 6 is made dependent on prior implementation of the main brake mechanism 1 by means (not shown) that are known in the field of manual control by cables or the like, which means are preferably disposed inside the helicopter cockpit. The secondary brake mechanism 6 is fitted with a secondary detection sensor 28 for detecting implementation of the secondary lever 15, so as to allow engine drive to be applied to the rotor, where applicable, and in spite of a clamping force being exerted on the disk 3 by the main lever 10.

The secondary detection sensor 28 is constituted in particular by an end-of-stroke sensor for the secondary lever 15, constituted in the example shown by two co-operating contact elements 29 and 30 supported respectively by the secondary lever 15 and by the body 8. These dispositions are such that, at the end of the stroke of the secondary lever 15, the secondary detection sensor 28 allows engine drive to be applied to the rotor, which drive is controlled by the pilot by interrupting action on the manual control members 2 and 7 respectively of the main and secondary levers 10 and 15 with which they are associated, to allow them to return simultaneously to the initial position under the effect of the corresponding return means.

What is claimed is:

1. A brake device for a helicopter rotor, the device associating a main brake mechanism comprising a disk and manual control for main braking of the rotor and a secondary brake mechanism for secondary braking of the rotor under strong wind, these brake mechanisms being operated by a pilot from the helicopter cockpit by respective main and secondary control means, the main brake mechanism comprising a disk constrained to rotate with the rotor and capable of being held stationary by a pair of jaws opposably mounted on a body to engage opposite sides of the disk, and a main lever hinged to the body to drive the jaws against main return means for returning the jaws into an initial position, wherein the secondary brake mechanism comprises a secondary lever hinged to the body and capable of being actuated against secondary return means in order to drive a presser finger against the main lever to cause the jaws to move correspondingly towards each other so that the secondary lever actuates the main lever to amplify the clamping forces on the disk delivered by the jaws compared with the forces they exert under drive from the main lever alone.

2. A brake device for a helicopter rotor according to claim 1, wherein the lever arm ratio of the main lever lies in the range approximately 6 to 8, while the lever arm ratio of the secondary lever lies in the range 9 to 12.

3. A brake device for a helicopter rotor according to claim 2, wherein the secondary lever is hinged to the body at its distal end and bears against the finger in the vicinity of said distal end, the finger itself bearing against the main lever in a zone of the main lever that is situated at a distance (L1) from the hinge axis of the main lever that is of the same order as the distance (L'1) between said hinge axis and the distal end of the main lever, whereby said main lever bears against at least one of the jaws in order to move them towards each other in opposite directions.

4. A brake device for a helicopter rotor according to claim 2, wherein the main and secondary levers are of substantially equivalent length, the finger bearing against the main lever in a zone of the main lever situated at a distance (L"1) from the distal end of the main lever that lies in the range approximately one-fourth to one-third of the length of the main lever.

5. A brake device for a helicopter rotor according to claim 1, wherein one of the jaws is mounted to move on the body while the other jaw is stationary relative to the body, the main lever bearing against the moving jaw to drive it towards the stationary jaw by means of at least one link fitted to the distal end of the main lever.

6. A brake device for a helicopter rotor according to claim 1, wherein the finger and the secondary return means are part of a spring piston carried by the body.

7. A brake device for a helicopter rotor according to claim 6, wherein the finger is made up of telescopically mounted elements, the secondary return means bearing against said telescopically-mounted elements being disposed therebetween, whereby a thrust exerted on the finger by the secondary lever compresses the secondary return means in association with the finger pressing against the main lever in order to drive the main lever.

8. A brake device for a helicopter rotor according to claim 1, including means for preventing the secondary brake mechanism being put into operation prior to the main brake mechanism being put into operation, so as to make operation of the secondary brake mechanism dependent on prior operation of the main brake mechanism.

9. A brake device for a helicopter rotor according to claim 1, the main brake mechanism being fitted with main detector means for detecting operation thereof to serve, where appropriate, to operate main inhibition means for inhibiting engine drive of the rotor, the secondary brake mechanism is fitted with secondary detector means for detecting operation of the secondary brake mechanism to act, where appropriate, to allow said engine drive to be applied in spite of the main inhibition means being put into operation.

10. A brake device for a helicopter rotor according to claim 9, wherein the secondary detection means comprise an end-of-stroke sensor of the secondary lever to guarantee that engine drive of the rotor is operated after the secondary brake mechanism has been operated, and to allow the rotor to be driven starting from a simultaneous release of drive being applied to the levers by the corresponding main and secondary control means.

11. A brake device for a helicopter rotor according to claim 1, wherein the main and secondary levers are fitted with means for adjusting their strokes.

12. A brake device for a rotor according to claim 11, wherein the means for adjusting the stroke of the main lever are means for adjusting the inclination of the main lever, while the means for adjusting the stroke of the secondary lever, which is of constant stroke, are interposed between the secondary and main levers to adjust the stroke of the bearing finger.

* * * * *